US008189454B2

(12) United States Patent
Balakrishnan et al.

(10) Patent No.: US 8,189,454 B2
(45) Date of Patent: May 29, 2012

(54) MULTI-BAND OFDM COMMUNICATIONS SYSTEM

(75) Inventors: Jaiganesh Balakrishnan, Dallas, TX (US); Anuj Batra, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1 day.

(21) Appl. No.: 12/773,584

(22) Filed: May 4, 2010

(65) Prior Publication Data

US 2010/0215077 A1 Aug. 26, 2010

Related U.S. Application Data

(62) Division of application No. 10/844,832, filed on May 13, 2004, now Pat. No. 7,835,262.

(60) Provisional application No. 60/470,532, filed on May 14, 2003, provisional application No. 60/477,184, filed on Jun. 10, 2003.

(51) Int. Cl.
  *H04J 11/00* (2006.01)
  *H04J 4/00* (2006.01)
  *H04W 4/00* (2009.01)
  *H04B 7/216* (2006.01)
  *H04B 1/00* (2006.01)
  *H04W 72/00* (2009.01)

(52) U.S. Cl. ........ 370/203; 370/330; 370/342; 370/478; 375/130; 455/464

(58) Field of Classification Search .......... 370/203–210, 370/228–230, 344, 478–480, 235, 328–330, 370/335, 338, 342; 375/130–135, 219, 260–262, 375/295–298, 341, 346, 354, 363, 140, 141, 375/145, 159, 290, 377; 455/63.1, 67.16, 455/504, 525, 166.1, 180.1, 182.1, 188.1, 455/450–454, 464, 509
See application file for complete search history.

(56) References Cited

U.S. PATENT DOCUMENTS

| 7,853,277 | B2 * | 12/2010 | Pendergrass et al. | ......... 455/502 |
| 2004/0160988 | A1 * | 8/2004 | Boehlke et al. | ............... 370/480 |
| 2008/0130685 | A1 * | 6/2008 | Rogerson et al. | ............. 370/478 |

\* cited by examiner

*Primary Examiner* — Habte Mered
(74) *Attorney, Agent, or Firm* — Steven A. Shaw; W. James Brady; Frederick J. Telecky, Jr.

(57) ABSTRACT

A method for providing communication in a wireless network comprising one or more simultaneously operating pico networks includes dividing UWB spectrum into a plurality of frequency bands. These bands are formed into band groups. At least one band group is assigned to each one of the pico networks. At least pne time frequency code is assigned to symbols associated with each one of the pico networks on a transmission-by-transmission basis. A system for channelization of the spectrum includes a frequency-synthesized oscillator and a time frequency code generator configured to assign time-frequency codes to successive transmissions of a pico network such that the successive transmissions are transmitted in all frequency bands of a band group assigned to the pico network.

12 Claims, 7 Drawing Sheets

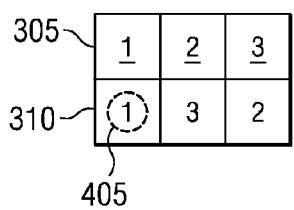
FIG. 4a
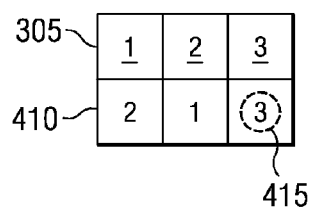
FIG. 4b
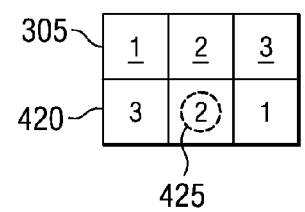
FIG. 4c
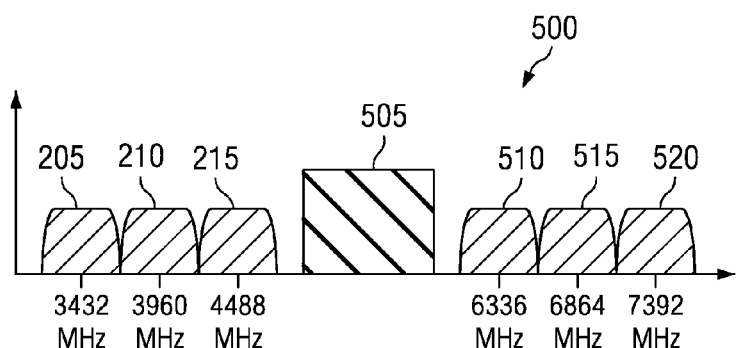
FIG. 5
| TFIS | |
|---|---|
| 1 2 3 4 5 6 | 805 |
| 1 4 6 2 3 5 | 810 |
| 1 3 2 6 5 4 | 815 |
| 1 4 2 5 6 3 | 820 |
FIG. 8
| TFIS | |
|---|---|
| 4 5 6 4 5 6 | 905 |
| 4 6 5 4 6 5 | 910 |
FIG. 9a
| TFIS | |
|---|---|
| 1 2 3 1 2 3 | 955 |
| 1 3 2 1 3 2 | 960 |
FIG. 9b

MULTI-BAND OFDM COMMUNICATIONS SYSTEM

This application is a Divisional of claims priority under 35 U.S.C. §120 to U.S. patent application Ser. No. 10/844,832, filed May 13, 2004 which claims the benefit of U.S. Provisional Applications: No. 60/470,532, filed May 14, 2003, entitled "Interleaving Sequences for Multiple Access;" and No. 60/477,184, filed Jun. 10, 2003, entitled "6-Channel Option for a TFI-OFDM System;" which applications are hereby incorporated herein by reference.

CROSS-REFERENCE TO RELATED APPLICATIONS

This application is related to the following co-pending and commonly assigned patent application Ser. No. 10/688,169, filed Oct. 18, 2003, entitled "Time-Frequency Interleaved Orthogonal Frequency Division Multiplexing Ultra Wide Band Physical Layer," which application is incorporated by reference.

TECHNICAL FIELD

The present invention relates generally to a system and method for digital communications, and more particularly to a system and method for providing multiple access in a multi-band, orthogonal frequency division multiplexed (multi-band-OFDM) digital communications system.

BACKGROUND

In order for a communications device to successfully complete a transmission, a collision should not occur with transmissions from other communications devices or with noise and other types of interference. It may be possible to recover from a collision with another transmission (or noise or other types interference) via the use of error detecting and correcting codes. However, such recovery is normally possible only if a small percentage of the transmission contains unreliable bits or information, such as a result of transient noise or interference, and not when a large percentage of the transmission is damaged, which is normally the case when a collision with another transmission occurs. Furthermore, the use of error detecting and correcting codes that can recover from significant damage can greatly reduce the overall throughput performance of a communications system due to the coding overhead.

One way to help reduce the probability of transmission collisions is to divide the available bandwidth in the communications channel into multiple transmission bands and then assign certain communications devices to the various transmission bands, wherein the communications devices can only transmit within their assigned transmission bands. By assigning communications devices to different transmission bands, the probability of collisions with other transmissions can be reduced. If the number of transmission bands is equal to or greater than the number of communications devices, then the probability of collisions can be reduced to zero.

Another way to help reduce the probability of transmission collisions is to allocate access to the communications channel based upon time, wherein a communications device can transmit only if it is within its transmission time window. Once again, the probability of collisions can be reduced to zero if only one communications device is assigned to a transmission time window.

One disadvantage of the prior art is that if the available bandwidth is divided into a large number of transmission bands, then the total amount of bandwidth available to a single communications device can be a small fraction of the total bandwidth. If only a small number of communications devices are transmitting, then the bandwidth utilization can be small, resulting in the waste of a significant amount of the available bandwidth.

A second disadvantage of the prior art is that unless properly allocated, the transmission time windows can be allocated to communications devices with nothing to transmit, while communications devices with a need to transmit may not receive enough transmission time windows to achieve adequate data throughput. Once again, this can lead to inefficient use of the available transmission bandwidth.

Another disadvantage of the prior art is that should an adaptive technique be applied to either the transmission bands or the transmission time windows, to increase bandwidth utilization, for example, then considerable resources may be needed to fairly and effectively distribute available bandwidth. This may require the use of a dedicated bandwidth server (or processor), which can increase the costs of the communications system.

SUMMARY OF THE INVENTION

These and other problems are generally solved or circumvented, and technical advantages are generally achieved, by preferred embodiments of the present invention which provides for a multi-channel transmit frequency interleaved, orthogonal frequency division multiplexed communications system and multiple access sequences for the communications system.

In accordance with a preferred embodiment of the present invention, a method for receiving a preamble includes receiving a current preamble that can be used for channel estimation. The current preamble is used for the estimation of channels present in both enhanced and legacy time-interleaved, orthogonal frequency division multiplexed communications systems. A header that contains physical layer parameters and media access control layer information is received. Also received is a channel estimation extension used for channel estimation. The channel estimated by the channel estimation extension are only present in the enhanced time-frequency interleaved, orthogonal frequency division multiplexed communications system. Other embodiments of the invention provide other features.

An advantage of a preferred embodiment of the present invention is that the multiple access communications system can accommodate known sources of interferers and frequency bands that should be avoided, to mitigate interference from and to these known trouble spots.

A further advantage of a preferred embodiment of the present invention is that transmission collisions in the communications system can be reduced with little or no scheduling or processing overhead. Therefore, a dedicated bandwidth scheduler or processor may not be needed, hence potentially reducing the cost of the communications system.

Yet another advantage of a preferred embodiment of the present invention is that a reduction in transmission collisions can improve the transmission throughput of the communications system, as well as the overall robustness of the communications system since it may not need to significantly degrade throughput to recover from collisions.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4a through 4c are diagrams of possible transmission collisions between transmission sequences, according to a preferred embodiment of the present invention;

FIG. 5 is a diagram of a frequency allocation for a wireless communications system, wherein a portion of the frequency is occupied by a known interferer, according to a preferred embodiment of the present invention;

FIG. 8 is a diagram of time-frequency interleaving sequences of length six for a communications system with six transmission bands, according to a preferred embodiment of the present invention;

FIGS. 9a and 9b are diagrams of time-frequency interleaving sequences of length six for a communications system using three transmission bands, according to a preferred embodiment of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a multi-band, orthogonal frequency division multiplexed (multi-band-OFDM) wireless communications system, such as one that is adherent to IEEE 802.15.3a technical specifications. The IEEE 802.15.3a technical requirements can be found in a document entitled "TG3a Technical Requirements," published Dec. 27, 2002, which is herein incorporated by reference. The invention may also be applied, however, to other communications systems, namely those that make use of a partitioning of available bandwidth into transmission bands and those that operate in areas with known sources of interference and frequency bands that need to be avoided.

The IEEE 802.15.3a technical requirements has specified a set of performance criteria, such as bit rate, effective operating range, power consumption, and so forth, for wireless devices. For example, a bit rate of at least 110 Mb/s at 10 meters is required. The technical requirements also specify that the communications system must be able to coexist with other wireless devices that may be in close proximity.

Figure 1A:
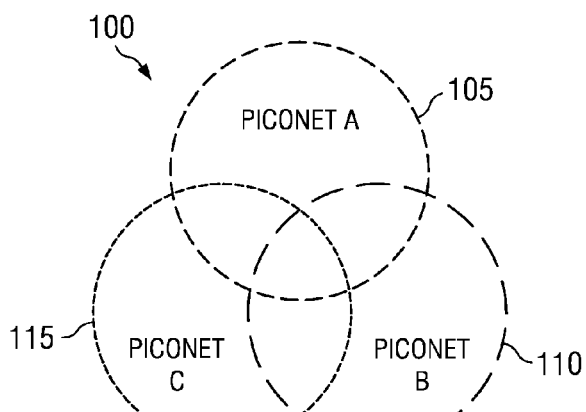
FIGS. 1a and 1b are coverage maps of multiple piconets operating within close proximity of one another.
Figure 1B:
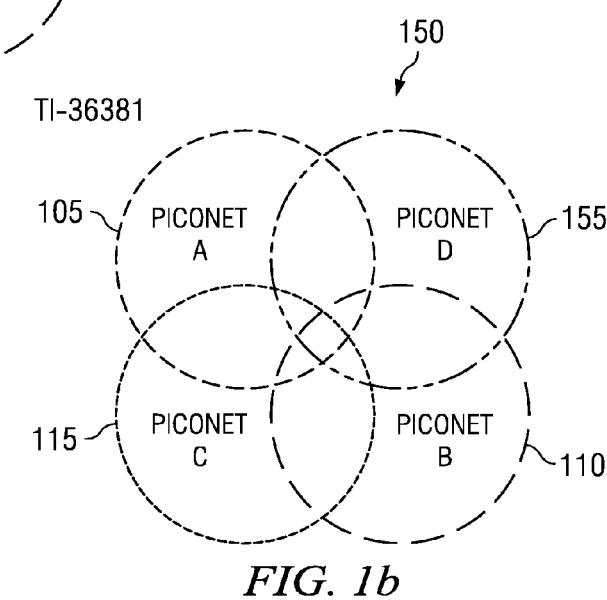

With reference now to FIGS. 1a and 1b, there are shown diagrams illustrating a coverage map (100 (FIG. 1a) and 150 (FIG. 1b)) of multiple piconets operating within close proximity of one another. The coverage map 100 illustrates three piconets (piconet A 105, piconet B 110, and piconet C 115) operating in close proximity, so close that portions of their coverage areas overlap. The coverage map 150 illustrates four piconets (piconets A through C and piconet D 155), wherein the piconets' coverage areas overlap.

Within the areas where the piconets' coverage areas overlap, transmissions from a transmitter in one piconet can collide with transmissions from a transmitter in another piconet. For example, a transmitter (not shown) in piconet A 105 may have its transmissions collide with transmissions from a transmitter (not shown) in piconet C 115.

Figure 2:
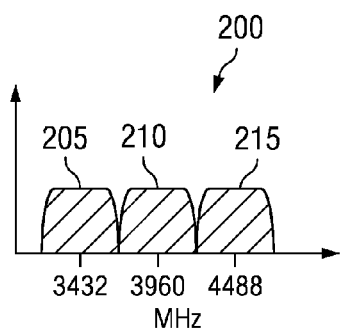
FIG. 2 is a diagram of a frequency allocation for a wireless communications system.

With reference now to FIG. 2, there is shown a diagram illustrating a frequency allocation 200 for a wireless communications system. As discussed previously, one way to help decrease the probability of transmission collisions is to divide the available bandwidth into multiple transmission bands and then assign certain transmitters to transmit within certain transmission bands. As shown in FIG. 2, the frequency allocation 200 is for a wireless communications system that operates within a frequency band of 3.168 GHz to 4.752 GHz, wherein the frequency band has been divided into three transmission bands: a first transmission band 205 with a center frequency at 3.432 GHz, a second transmission band 210 with a center frequency at 3.960 GHz, and a third transmission band 215 with a center frequency at 4.488 GHz. With three transmission bands, the wireless communications system may be able to support three piconets, which can be simultaneously transmitting, without collision. If more than three piconets are to be supported, then there may be transmission collisions, since there will be at least one transmission band wherein more than one piconet that may be transmitting.

However, rather than assigning a piconet to transmit only within a certain transmission band, which can result in a waste of bandwidth allocated to the transmission band if the piconet is not transmitting, it may be possible to specify an order of usage of the transmission bands that can be used by a piconet. The order of usage, which may be referred to as a transmission sequence, can specify a sequence of transmission bands that the piconet should use when transmitting. For example, if the piconet transmits during a certain time interval, then it should use a transmission band specified for use during that time interval, and if it has something to transmit during the subsequent interval, then it should use a transmission band specified for the subsequent interval. When properly specified, the use of the transmission sequence can result in a relatively low probability of transmission collisions combined with usage of the entire bandwidth of the communications system.

Figure 3A:
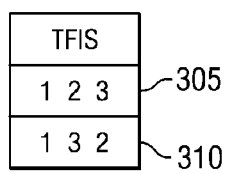
FIGS. 3a and 3b are diagrams of time-frequency interleaving sequences of length three and six, according to a preferred embodiment of the present invention.
Figure 3B:
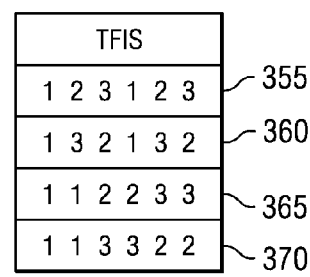

With reference now to FIGS. 3a and 3b, there are shown diagrams illustrating time-frequency interleaving sequences (TFIS) of length three (FIG. 3a) and six (FIG. 3b) for a multi-band OFDM wireless communications system with three transmission bands, according to a preferred embodiment of the present invention. For discussion purposes, let the three transmission bands be referred to by their numerical identifiers: "1," "2," and "3." Then, for transmission sequences of length three, there may be two transmission sequences that can be shown to be optimal. A first transmission sequence 305 can be specified as [1 2 3] and a second transmission sequence 310 can be specified as [1 3 2]. Note that when using time-interleaving, a multi-band OFDM wireless communications system may be referred to as a TFI-OFDM wireless communications system.

The first transmission sequence 305 and the second transmission sequence 310 are considered to be optimal because if they are used to specify transmissions for two asynchronous piconets with overlapping coverage areas, then there may be a guarantee of only a single collision over any three transmissions. For example, if piconet A transmits using the first transmission sequence 305 and piconet B transmits using the second transmission sequence 310 and both start transmissions at the same time, then only their initial transmissions will collide, with the two subsequent transmissions being carried on different transmission bands and hence no collisions will occur.

FIG. 3b illustrates four transmission sequences of length six. These four length six sequences (a first sequence 355, a second sequence 360, a third sequence 365, and a fourth sequence 370) can be used to permit up to four asynchronous piconets with overlapping coverage areas share three transmission bands. Note that the four length six sequences are what can be considered near-optimal. They are near-optimal in that certain pairs of the sequences are pairwise optimal, but not every pair of the sequences are pairwise optimal. One way to find transmission sequences is via simulation.

With reference now to FIGS. 4a through 4c, there are shown diagrams illustrating possible transmission collisions between two transmission sequences, according to a preferred embodiment of the present invention. FIG. 4a displays two transmission sequences: the first transmission sequence 305 being [1 2 3] and the second transmission sequence 310 being [1 3 2] as shown in FIG. 3a. If two asynchronous piconets were to use the two transmission sequences as shown, then a transmission collision 405 may occur during a first specified transmission time when both asynchronous piconets transmit on transmission band #1. Note that the subsequent transmission times may not result in transmission collisions since different transmission bands are being used.

With reference now to FIG. 4b, which displays two transmission sequences, the first transmission sequence 305 and a shifted version 410 of the second transmission sequence 305. The shifted version 410 may represent a transmission sequence used by an asynchronous piconet with a different transmission time clock. If two asynchronous piconets were to use the two transmission sequences as shown, then a transmission collision 415 may occur during a third specified transmission time when both asynchronous piconets transmit on transmission band #3.

With reference now to FIG. 4c, which displays two transmission sequences, the first transmission sequence 305 and a shifted version 420 of the second transmission sequence 305. The shifted version 420 may represent a transmission sequence used by an asynchronous piconet with a different transmission time clock. If two asynchronous piconets were to use the two transmission sequences as shown, then a transmission collision 425 may occur during a second specified transmission time when both asynchronous piconets transmit on transmission band #2. A similar set of diagrams can be used to show potential transmission collisions for the length six sequences (the first sequence 355, the second sequence 360, the third sequence 365, and the fourth sequence 370) displayed in FIG. 3b.

The partitioning of available transmission bandwidth into a plurality of transmission bands has been shown to enable the sharing of the transmission bandwidth by multiple asynchronous (uncoordinated) piconets. In addition to the simple sharing of the available bandwidth among multiple piconets, the transmission bands can also be used to avoid interference from other electronic devices and noise and interfering with other electronic devices. Avoiding interference from and interfering with other electronic devices may be accomplished by not using (and listening to) transmission bands that occupy the same frequency bands as those used by the electronic devices as long as these electronic devices (and their frequency bands) are known before hand.

With reference now to FIG. 5, there is shown a diagram illustrating a frequency allocation 500 for a wireless communications system, wherein a portion of the frequency is occupied by a known interferer, according to a preferred embodiment of the present invention. As specified by the IEEE 802.15.3a technical requirements, a communications system that is compliant must be able to accept interference from and not cause undo interference to other electronic devices operating nearby. A frequency band that is seeing a great deal of interest is the Unified National Information Infrastructure (UNII) band, located at 5.15 to 5.825 GHz. The UNII band has been used for wireless computer networking, cordless telephones, and other unlicensed devices in countries such as the United States and Japan.

One way to not cause interference to and receive interference from electronic devices operating at a frequency range may be to exclude the frequency range from any transmissions. By preventing transmissions from using the excluded frequency range (such as the UNII band), electronic devices operating in the excluded frequency range will not be interfered with and the communications system will not receive interference from the electronic devices since the communications system will not be expecting transmissions from the excluded frequency range.

FIG. 5 displays the frequency allocation 500 for a communications system, wherein the frequency allocation 500 features six transmission bands: the first transmission band 205 with a center frequency at 3.432 GHz, the second transmission band 210 with a center frequency at 3.960 GHz, the third transmission band 215 with a center frequency at 4.488 GHz, a fourth transmission band 510 with a center frequency at 6.336 GHz, a fifth transmission band 515 with a center frequency at 6.864 GHz, and a sixth transmission band 520 with a center frequency at 7.392 GHz. Note that the first, second, and third transmission bands (205, 210, and 215) may be similar to the transmission bands displayed in the frequency allocation 200 (FIG. 2).

The first, second, and third transmission bands (205, 210, and 215) may be below a frequency band 505 that can be representative of the UNII frequency band, while the fourth, fifth, and sixth transmission bands (510, 515, and 520) may be above the frequency band 505. Note that depending upon the actual location of the frequency band 505 and the desired number of transmission frequencies, the location (center frequencies) of transmission bands may be different. For example, there may be a desire for only four transmission bands or there may be multiple frequency bands to avoid, both of which can change the frequency allocation. Furthermore, depending on the number of piconets to support as well as the amount of spectrum available, it may be possible to add additional transmission bands or it may not be possible to have all six transmission bands as shown. The allocation of the spectrum may be dependent upon factors such as the number of piconets to support, the presence of known interferers, the amount of spectrum available, and so forth.

Note that by simply repeating the frequency allocation 200 of FIG. 2, a total of 264 MHz of spectrum may be wasted. One way to recover this lost spectrum may be to introduce a frequency offset of 264 MHz to the transmission bands above the frequency band 505, namely, the fourth, fifth, and sixth transmission bands (510, 515, and 520). Using well known single-sideband generation techniques, the center frequencies of each of the transmission bands can be generated. Starting with a frequency of 8448 MHz, the continued division by a factor of two (2) can result in frequencies of 4224 MHz, 2112 MHz, 1056 MHz, 528 MHz, and 264 MHz. Note that for a different frequency allocation, a different starting frequency and division factor may be needed. Then, using the generated frequencies, the center frequencies of the transmission bands can be generated as follows (note that it can be possible to express the center frequencies as a sum (and difference) of powers of two (2) factors of the smallest generated frequency, 264 MHz):

Band#1 – 3432 MHz = 4224 MHz – 1056 MHz + 264 MHz = 16 * a – 4 * a + a (wherein a = 264 MHz)
Band#2 – 3960 MHz = 4224 MHz – 264 MHz = 16 * a – a
Band#3 – 4488 MHz = 4224 MHz + 264 MHz = 16 * a + a
Band#4 – 6336 MHz = 4224 MHz + 2112 MHz = 8448 MHz – 2112 MHz = 16 * a + 8 * a
Band#5 – 6864 MHz = 4224 MHz + 2112 MHz + 528 MHz = 8448 MHz – 528 MHz = 16 * a + 8 * a + 2 * a
Band#6 – 7392 MHz = 4224 MHz + 2112 MHz + 1056 MHz = 8446 MHz – 1056 MHz = 16 * a + 8 * a + 4 * a.

Since each transmission band's center frequency may be expressed as a sum (and/or difference) of powers of two factors of the smallest generated frequency, a single circuit may be used to generate the center frequency for both the lower three transmission bands (the first, second, and third transmission bands 205, 210, and 215) and the upper three transmission bands (the fourth, fifth, and sixth transmission bands 510, 515, and 520). Since a single circuit can be used to generate all of the center frequencies, the generation of the center frequencies can be simplified and may be more efficient, when compared to techniques that may require multiple center frequency generating circuits. Note that should additional transmission bands (above the sixth transmission band 520) be desired, the same technique can be used to generate their center frequencies.

In a multi-band-OFDM wireless communications system, a preamble sequence can be used for packet detection, frame synchronization, frequency offset estimation, channel estimation, and so forth. Therefore, when additional transmission bands are added to a multi-band-OFDM wireless communications system, the preamble sequence should be modified in such a way that the previous uses of the preamble sequence (such as packet detection, frame synchronization, frequency offset estimation, and channel estimation) can be used in the additional transmission bands. However, compatibility with existing multi-band-OFDM wireless communications systems without the additional transmission bands should be maintained. Therefore, the modified preamble sequence should be able to be used in both existing and enhanced multi-band-OFDM wireless communications systems without modification.

Figure 6:
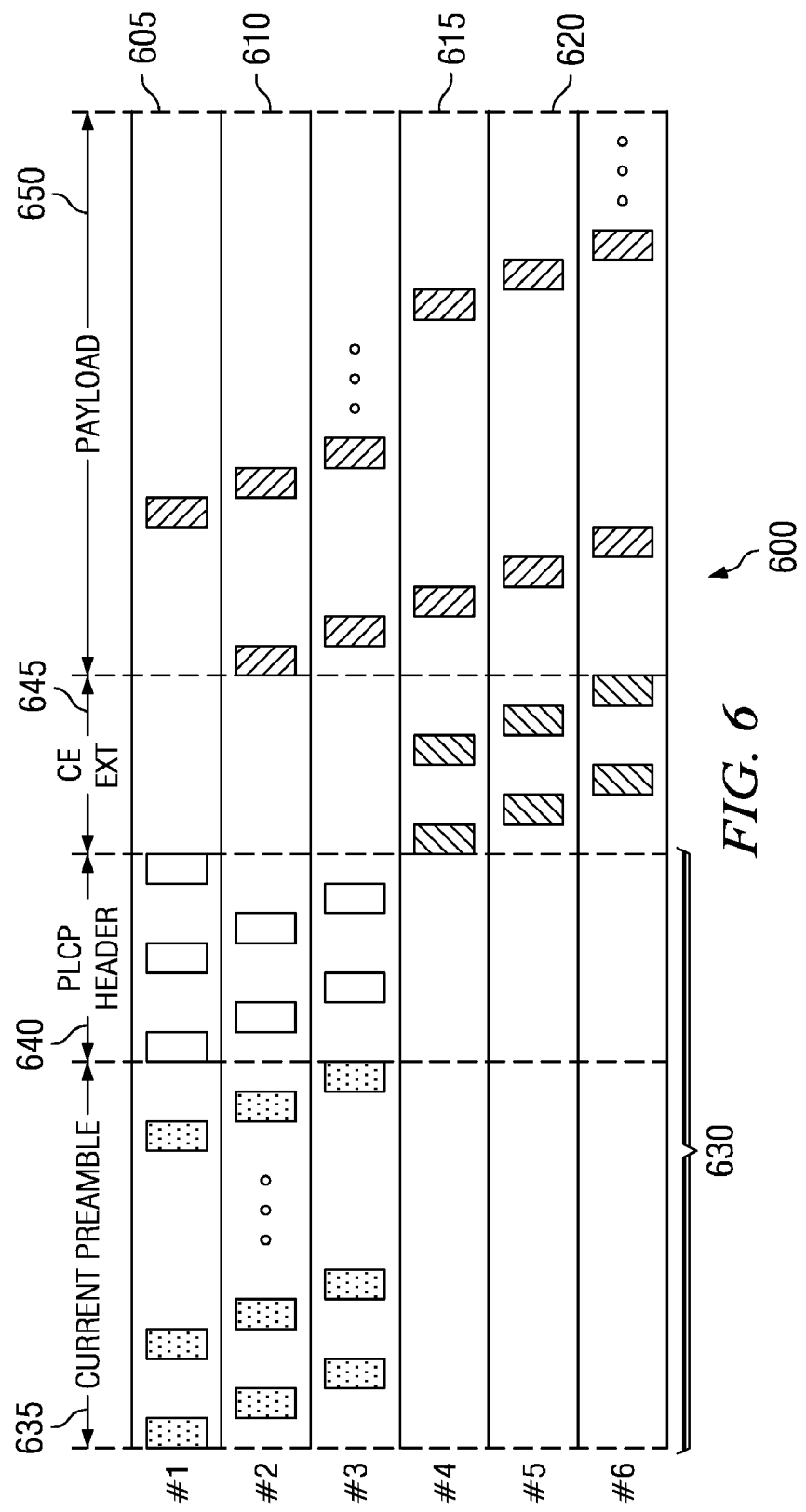
FIG. 6 is a diagram of a transmission sequence in an enhanced multi-band-OFDM wireless communications system with additional transmissions bands containing an enhanced preamble to support the additional transmission bands, according to a preferred embodiment of the present invention.

With reference now to FIG. 6, there is shown a space-time diagram illustrating a transmission sequence 600 in an enhanced multi-band-OFDM wireless communications system with additional transmissions bands containing an enhanced preamble to support the additional transmission bands, according to a preferred embodiment of the present invention. A first approach to extending a preamble sequence for an enhanced multi-band-OFDM wireless communications system can be to maintain an existing preamble sequence 630 and then after the existing preamble sequence 630, adding a channel estimation extension 645, which can be used to estimate the channel response on the additional transmission bands.

The transmission sequence 600 displays the transmissions for a multi-band-OFDM wireless communications system with six transmission bands (such as transmission band #1 605, band #2 610, band #4 615, and band #5 620). The transmission sequence 600 displays the existing preamble 630, which can comprise a current preamble 635 and a PLCP header 640. Note that the existing preamble 630 can be compatible in multi-band-OFDM wireless communications systems without the additional transmissions bands (i.e., a legacy multi-band-OFDM wireless communications system), therefore, transmissions in the existing preamble 630 are contained in the existing transmission bands (transmissions bands #1 605, #2 610, and #3). The channel estimation extension 645 can contain transmissions on the additional transmission bands (transmission bands #4 615, #5 620, and #6) and these transmissions can be used to compute estimations of the additional transmission bands. A payload 650 contains data and control transmissions using the various transmission bands.

An advantage of adding the channel estimation extension 645 at the end of the existing preamble 630 may be that existing devices (commonly referred to as legacy devices), i.e., devices that only communication using transmission bands #1, #2, and #3, can always decode the existing preamble 630 (the current preamble 635 and the PLOP header 640) and can be able to configure their network allocation vector (NAV) appropriately. An additional advantage of adding the channel estimation extension 645 at the end of the existing preamble 630 can be that a device can use the PLOP header 640 to signal the presence of the channel estimation extension 645 and whether or not the payload 650 will be using the additional transmission channels. This can allow receivers the luxury of not needing to know a priori the transmission mode of the transmitter.

Figure 7:
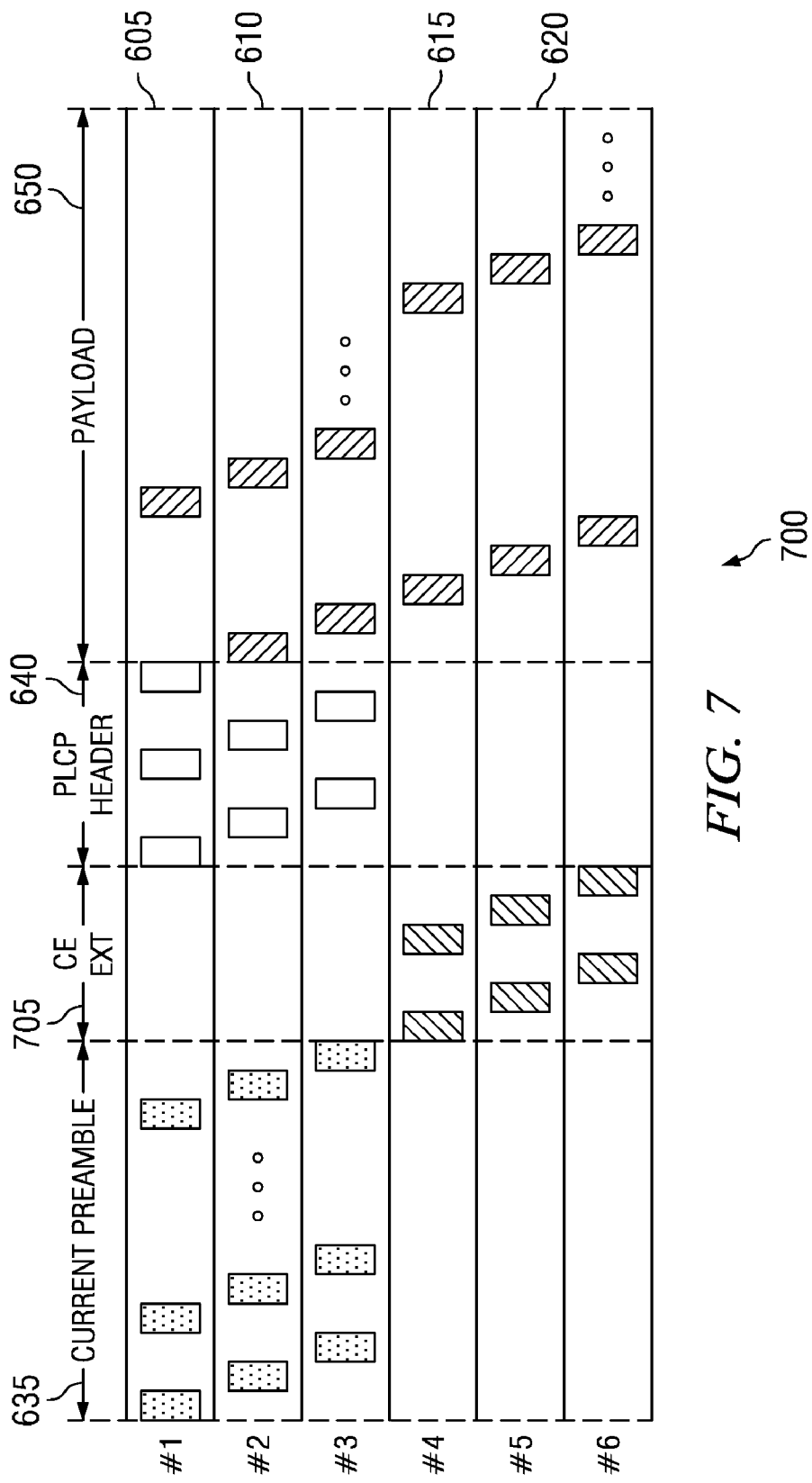
FIG. 7 is a diagram of a transmission sequence in an enhanced multi-band-OFDM wireless communications system with additional transmissions bands containing an enhanced preamble to support the additional transmission bands, according to a preferred embodiment of the present invention.

With reference now to FIG. 7, there is shown a space-time diagram illustrating a transmission sequence 700 for use in an enhanced multi-band-OFDM wireless communications system with additional transmissions bands containing an enhanced preamble to support the additional transmission bands, according to a preferred embodiment of the present invention. A second approach to extending a preamble sequence for an enhanced multi-band-OFDM wireless communications system can be to insert a channel estimation extension 705 in between the current preamble 635 and the PLOP header 640. As previously, the channel estimation extension 705 can be used to estimate the channel response on the additional transmission bands.

The transmission sequence 700 displays the transmissions for a multi-band-OFDM wireless communications system with six transmission bands (numbered #1 through #6). The transmission sequence 700 displays the current preamble 635 and the PLOP header 640 with the channel estimation extension 705 positioned in between the two. An advantage of inserting the channel estimation extension 705 in between the current preamble 635 and the PLOP header 640 can be that it fits more naturally with the frequency division multiple access (FDMA) technique, i.e., the preamble (comprising the current preamble 635, the channel estimation extension 705, and the PLCP header 640) can be readily scaled to a single channel.

With reference now to FIG. 8, there is shown a diagram illustrating time-frequency interleaving sequences (TFIS) of length six for a communications system with six transmission bands, according to a preferred embodiment of the present invention. For discussion purposes, let the six transmission bands be referred to by numerical identifiers: "1," "2," "3," "4," "5," and "6." Then, for transmission sequences of length six, there may be four transmission sequences that can be shown to be near optimal. A first transmission sequence 805 can be specified as [1 2 3 4 5 6], a second transmission sequence 810 can be specified as [1 4 6 2 3 5], a third transmission sequence 815 can be specified as [1 3 2 6 5 4], and a fourth transmission sequence 820 can be specified as [1 4 2 5 6 3]. The four transmission sequences shown in FIG. 8 can permit the sharing of six transmission bands by four transmitters with near optimal performance. Note that transmission sequences of different length can be specified, some of which may be optimal.

With reference now to FIGS. 9a and 9b, there are shown diagrams illustrating time-frequency interleaving sequences of length six for a communications system using three transmission bands, according to a preferred embodiment of the present invention. In a wireless communications system, a single transmitter may be allowed to transmit on all of the available transmission bands (such as shown in the TFIS shown in FIG. 8). However, it may also be possible to limit a single transmitter to a subset of the available transmission bands. By limiting the number of transmission bands that a single transmitter can use, then it can be possible to increase the number of transmitters that can use the transmission bands. For example, in a wireless communications system with six transmission bands, if each transmitter is limited to three transmission bands, then four transmitters can share each group of three transmission bands (using the TFIS shown in FIG. 3b, for example) for a total of eight transmitters in the wireless communications system.

FIG. 9a displays two transmission sequences of length six using three transmission bands, a first transmission sequence 905 can be specified as [4 5 6 4 5 6] and a second transmission sequence 910 can be specified as [4 6 5 4 6 5]. FIG. 9b displays two transmission sequences of length six using three transmission bands, wherein the transmission bands are different from those shown in FIG. 9a. The transmission sequences shown in FIG. 9b may be a first transmission sequence 955 that can be specified as [1 2 3 1 2 3] and a second transmission sequence 960 that can be specified as [1 3 2 1 3 2].

In a given wireless communications system, each transmission band may have a fixed bandwidth. Furthermore, in a multi-band-OFDM wireless communications system, the available bandwidth can be allocated to provide a desired transmission range, at the expense of data rate. Therefore, for a given application, the bandwidth afforded by a transmitter's allocated transmission band may not be able to provide a desired data rate or transmission range. In a lightly used wireless communications system, it may be possible to increase the data rate and/or transmission range at a cost of reducing the number of available transmission bands (and hence reducing the total number of transmitters that can be supported).

Figure 10:
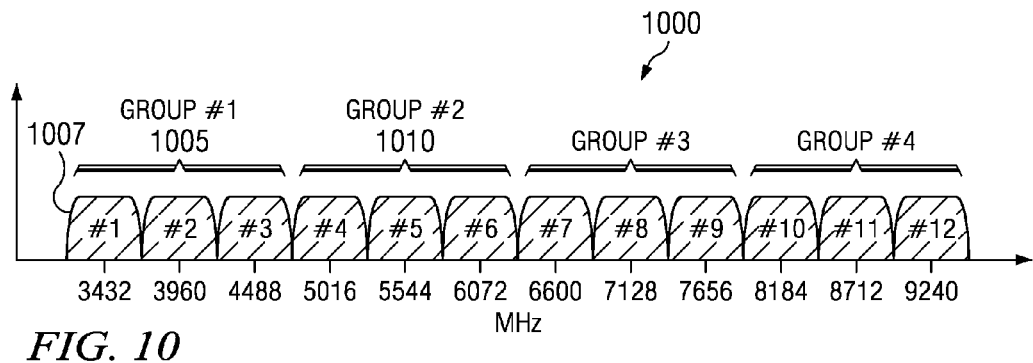
FIG. 10 is a diagram of a frequency allocation chart for a multi-band-OFDM wireless communications system, according to a preferred embodiment of the present invention.

With reference now to FIG. 10, there is shown a diagram illustrating a frequency allocation chart 1000 for a multi-band-OFDM wireless communications system, according to a preferred embodiment of the present invention. The frequency allocation chart 1000 may illustrate one possible transmission band allocation for a multi-band-OFDM wireless communications system. As shown, there are 12 transmission bands (numbered from #1 to #12), such as transmission band #1 1007. The 12 transmission bands can be partitioned into groups of three, for example, group #1 1005 can be made up of transmission bands #1, #2, and #3, while group #2 1010 can be made up of transmission bands #4, #5, and #6, and so forth.

As discussed previously, the partitioning of the available transmission bands can permit a greater number of transmitters to share the available bandwidth. As shown in FIG. 10, each transmission band can have a bandwidth of 528 MHz, which when using OFDM with no coding and no spreading, a maximum bit rate of 640 Mbps may be possible. In addition to using multi-band-OFDM, it may be possible to transmit OFDM symbols in a frequency-division multiplexing (FDM) mode, wherein the OFDM symbols are transmitted on a single transmission band (no time-frequency interleaving). An advantage in the use of TFI-OFDM over the FDM-OFDM may be an increase in range and robustness to multipath. Regardless of the way that the OFDM symbols are transmitted (either TFI-OFDM or FDM-OFDM), the maximum bit rate remains at 640 Mbps. Note that the frequency allocation chart 1000 displayed in FIG. 10 is but one way to allocate the available spectrum. Other spectrum allocations may be possible, with a larger (or smaller) number of transmission bands, with a larger (or smaller) number of transmission bands per group, with (or without) frequency bands set aside for known interferers, and so forth.

As displayed in FIG. 10, there are four groups of three transmission bands (groups #1, #2, #3, and #4). Referring back to FIG. 3b, there can be four optimal time-frequency interleaved sequences of length six for use with three transmission bands. Therefore, it can be possible for the TFI-OFDM wireless communications system with the frequency allocation chart 1000 to support up to 16 piconets, i.e., four piconets per group of three transmission bands.

Figure 11:
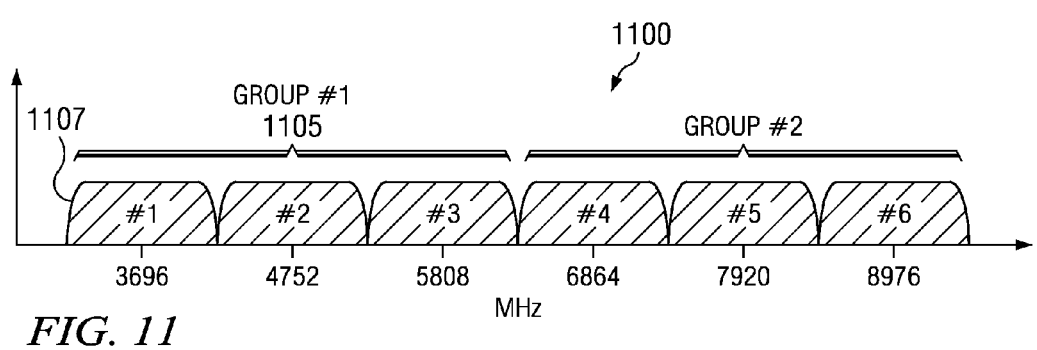
FIG. 11 is a diagram of a frequency allocation chart for a multi-band-OFDM wireless communications system, wherein sets of two transmission bands have been bonded into one transmission band, according to a preferred embodiment of the present invention.

With reference now to FIG. 11, there is shown a diagram illustrating a frequency allocation chart 1100 for a multi-band-OFDM wireless communications system, wherein sets of two transmission bands have been bonded into one transmission band, according to a preferred embodiment of the present invention. The frequency allocation chart 1100 may illustrate one possible transmission band allocation for a multi-band-OFDM wireless communications system, wherein single transmission bands, such as transmission band #1 1107 may be made from bonding two smaller transmission bands. Note that the frequency allocation chart 1100 may represent a multi-band-OFDM wireless communications system made from a multi-band-OFDM wireless communications system whose frequency allocation may have been shown in FIG. 10.

With each transmission band being made by binding two smaller transmission bands (and using the frequency allocation chart 1000 as a discussion reference), each transmission band may have a bandwidth of 1056 MHz and when using OFDM with no coding and no spreading, a maximum bit rate of 1280 Mbps may be possible. Once again, the transmission bands may be partitioned into groups of three, such as group #1 1105 that can be made up of transmission bands #1, #2, and #3. Note that since each transmission band is made up of two smaller transmission bands, the total number of transmission bands available in the multi-band-OFDM wireless communications system is smaller than the total number of transmission bands available in the multi-band-OFDM wireless communications system shown in FIG. 10. Furthermore, FIG. 11 displays one possible spectrum allocation and there may be other possible spectrum allocations.

As discussed above, if a TFI-OFDM wireless communications system with the frequency allocation chart 1100 makes use of the four time-frequency interleaved sequences of length six displayed in FIG. 3b, then it may be able to support up to eight piconets, wherein each piconet can transmit at up to twice the bit rate of piconets using unbonded transmission bands. Alternatively, the piconets can take advantage of the greater bandwidth to achieve greater operating range.

Figure 12:
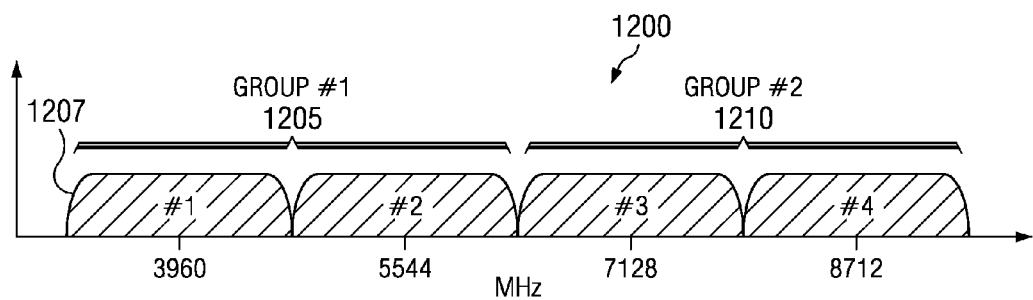
FIG. 12 is a diagram of a frequency allocation chart for a multi-band-OFDM wireless communications system, wherein sets of three transmission bands have been bonded into one transmission band, according to a preferred embodiment of the present invention.

With reference now to FIG. 12, there is shown a diagram illustrating a frequency allocation chart 1200 for a multi-band-OFDM wireless communications system, wherein sets of three transmission bands have been bonded into one transmission band, according to a preferred embodiment of the present invention. The frequency allocation chart 1200 may illustrate one possible transmission band allocation for a multi-band-OFDM wireless communications system, wherein single transmission bands, such as transmission band #1 1207 may be made from bonding three smaller transmission bands. Note that the frequency allocation chart 1200 may represent a multi-band-OFDM wireless communications system made from a multi-band-OFDM wireless communications system whose frequency allocation may have been shown in FIG. 10.

With each transmission band being made by binding three smaller transmission bands (and using the frequency allocation chart 1000 as a discussion reference), each transmission band may have a bandwidth of 1584 MHz and when using OFDM with no coding and no spreading, a maximum bit rate of 1920 Mbps may be possible. Once again, the transmission bands may be partitioned into groups of three, such as group #1 1105 that can be made up of transmission bands #1, #2, and #3. Note that since each transmission band is made up of three smaller transmission bands, the total number of transmission bands available in the multi-band-OFDM wireless communications system is smaller than the total number of transmission bands available in the multi-band-OFDM wireless communications system shown in FIG. 10. Furthermore, FIG. 11 displays one possible spectrum allocation and that there may be other possible spectrum allocations.

Note that with such large transmission bands (in terms of bandwidth) and correspondingly, a small number of transmission bands, it may be more likely to use FDM-OFDM rather than TFI-OFDM. However, it may be possible to create a TFI-OFDM wireless communications system using groups of two bands, wherein group #1 1205 may include transmission bands #1 and #2 and group #2 1210 may include transmission bands #3 and #4. Then, TFIS sequences of length four may be used. For example, group #1 1205 may use TFIS sequences [1 1 2 2] and [1 2 1 2] and group #2 1210 may use TFIS sequences of [3 3 4 4] and [3 4 3 4]. Alternatively, it can be possible to mix operating modes, wherein some of the transmission bands may make use of FDM-OFDM while others use TFI-OFDM. The operating mode can be provided to the receivers during the configuration of the transmission bands, such as prior to commencement of transmissions or during startup.

Figure 13:
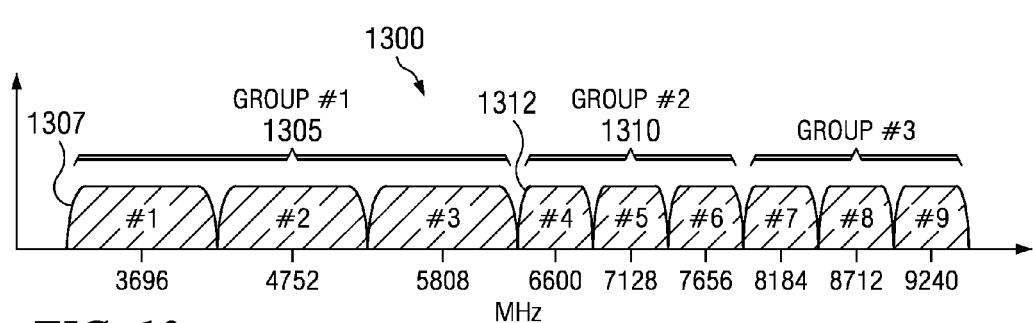
FIG. 13 is a diagram of a frequency allocation chart for a multi-band-OFDM wireless communications system, wherein some transmission bands have been bonded and some have not been bonded, according to a preferred embodiment of the present invention.

With reference now to FIG. 13, there is shown a diagram illustrating a frequency allocation chart 1300 for a multi-band-OFDM wireless communications system, wherein some transmission bands have been bonded and some have not been bonded, according to a preferred embodiment of the present invention. FIGS. 10, 11, and 12 displayed frequency allocation charts 1000, 1100, and 1200 for wireless communications systems wherein the transmission bands are homogeneous in nature, i.e., each transmission band is equal in size to every other transmission band in the wireless communications system. However, depending upon the available spectrum, the number of transmission bands, the individual data rate and range requirements of transmitters, and so forth, the transmission bands may vary in size.

The frequency allocation chart 1300 displays a spectrum allocation for a multi-band-OFDM wireless communications wherein the transmission bands can vary in bandwidth. For example, transmission bands in group #1 1305, such as transmission band #1 1307, can be constructed by bonding two transmission bands together, while transmission bands in group #2 1310, such as transmission band #4 1312 may have the bandwidth of a single transmission band. Note that the spectrum allocation shown in FIG. 13 may be one of many different possible configurations, and that the frequency allocation chart 1300 should not be construed as limiting the spirit of the present invention.

The spectrum allocation may be static or dynamic in nature. For a static spectrum allocation, the transmission bands may be allocated during an initial power-on sequence and may be set to provide a specific data rate or range performance requirement. The performance requirement may also specify a certain performance level under the presence of a specified amount of interference. According to a preferred embodiment of the present invention, the data rate and/or range performance requirement may be programmed into a controller that may be responsible for coordinating communications in a multi-band-OFDM wireless communications system during the configuration of the controller. The performance requirement may also be in hardware, software, or in a firmware upgrade. Furthermore, the performance requirement may be specified by a regulatory body (such as the Federal Communications Commission in the United States), an application using the multi-band-OFDM wireless communications system, a compliance and interoperability body (such as WiMedia, a compliance body to ensure interoperability for personal-area wireless devices or similarly, the Multi-band OFDM Alliance), or a manufacturer of the multi-band-OFDM communications systems.

Alternatively, during normal operations, the controller may be placed into a special configuration mode wherein the data rate and/or range performance requirements may be specified. Once the data rate and/or range performance requirements may be specified, the multi-band-OFDM wireless communications system may be reset in order to reconfigure the transmission bands. Alternatively, the spectrum allocation may be dynamic in nature, wherein the transmission bands can change based upon the needs of communicating devices in the multi-band-OFDM wireless communications network.

Figure 14:
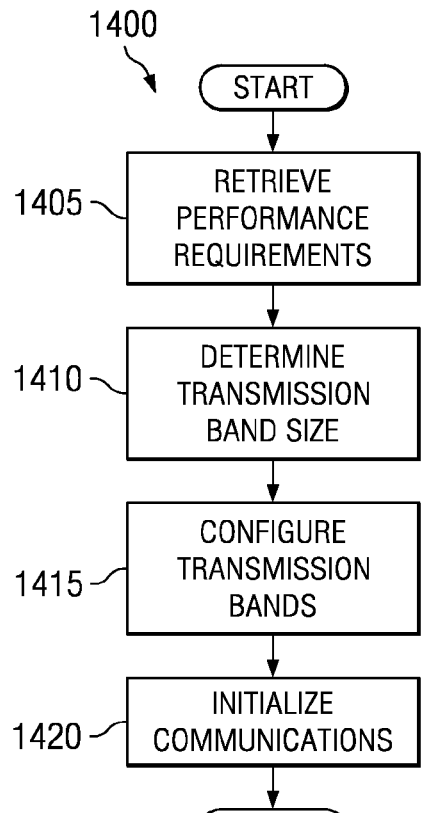
FIG. 14 is a flow diagram of an algorithm for use in configuring transmission bands for a multi-band-OFDM wireless communications system, according to a preferred embodiment of the present invention.

With reference now to FIG. 14, there is shown a flow diagram illustrating an algorithm 1400 for use in configuring transmission bands for a multi-band-OFDM wireless communications system, according to a preferred embodiment of the present invention. According to a preferred embodiment of the present invention, the algorithm 1400 may execute on a processing element, a controller, a general purpose central processing unit, a custom design application specific integrated circuit, or so forth, of a controller that may be responsible for coordinating communications in the multi-band-OFDM wireless communications system. The controller can often be referred to as a piconet coordinator or an access point. The controller can execute the algorithm 1400 during a power-up sequence, after a reboot, or after the execution of a specific operation to initialize the reconfiguration of the transmission bands.

The controller can begin by retrieving performance requirements for the multi-band-OFDM wireless communications system from memory (block 1405). According to a preferred embodiment of the present invention, the performance requirements may specify a desired data rate and/or range performance requirements. Based upon the performance requirements, the controller can determine the size (bandwidth) of the transmission bands (block 1410). If the performance requirements are low, then the size of the transmission bands can be low, while if the performance requirements are high, then the size of the transmission bands can be high. After determining the size of the transmission bands, which can also determine the number and center frequencies of the transmission bands, the controller can configure the transmission bands (block 1415). After configuration (block 1415), the controller can initialize the communications (block 1420). Initialization may entail the controller providing the configuration of the transmission bands to the transmitters and receivers in the multi-band-OFDM wireless communications system. After initialization, the controller can complete the execution of the algorithm 1400.

Figure 15:
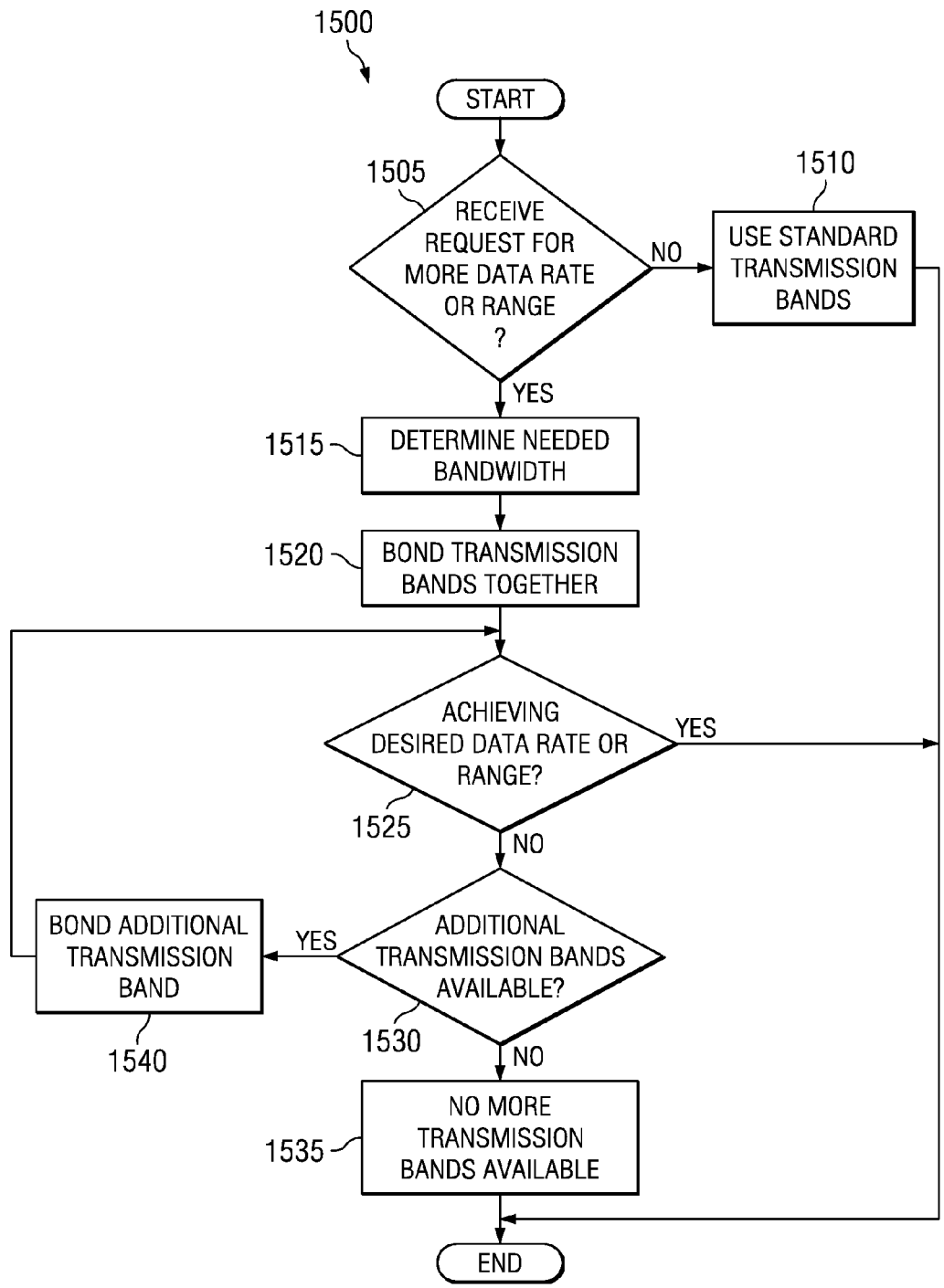
FIG. 15 is a flow diagram of an algorithm for use in bonding transmission bands for a multi-band-OFDM wireless communications system, according to a preferred embodiment of the present invention.

With reference now to FIG. 15, there is shown a flow diagram illustrating an algorithm 1500 for use in bonding transmission bands for a multi-band-OFDM wireless communications system, according to a preferred embodiment of the present invention. According to a preferred embodiment of the present invention, the algorithm 1500 may execute on a processing element, a controller, a general purpose central processing unit, a custom design application specific integrated circuit, or so forth, of a controller that may be responsible for coordinating communications in the multi-band-OFDM wireless communications system. The controller can execute the algorithm 1400 when there is a need for additional data rate or range than what is currently available.

A dynamic spectrum allocation algorithm can offer the ability to change the transmission bands based upon the demands of the communicating devices (transmitters and receivers) in the multi-band-OFDM wireless communications network. This ability can help improve the ability of the multi-band-OFDM wireless communications network to meet the performance requirements of the communications devices. According to a preferred embodiment of the present invention, when a communicating device needs to change its performance requirements (i.e., data rate and/or range performance requirements), the communicating device may transmit the request to the controller.

The controller can begin the execution of the algorithm 1500 when it receives a request(s) from communicating devices for more data rate and/or range performance (block 1505). If no requests are received or if the request can be met without channel bonding (blocks 1505 and 1510), then the algorithm 1500 can terminate. The controller can then determine the needed bandwidth to support the requested data rate and/or range performance (block 1515). Based on the needed and available bandwidth, the controller can bond together transmission bands and allocate them to the communicating device making the request (block 1520). Note that not shown may be additional operations that may be taken by the controller to free sufficient bandwidth in order to bond adjacent transmission bands. For example, the controller may need to move allocated transmission bands in order to have a sufficient number of adjacent transmission bands to bond together. This can be referred to as compacting the transmission spectrum. Compacting algorithms are considered to be well understood by those of ordinary skill in the art of the present invention and will not be discussed herein.

After allocating the transmission bands to the communicating device, the controller can monitor the communications to determine if the desired data rate and/or range performance is met (block 1525). If the desired data rate and/or range performance is met, then the algorithm 1500 can terminate. If the desired data rate and/or range performance is not met, then the controller can check if there is additional bandwidth available (block 1530). Once again, the controller may be required to perform a compaction of the transmission spectrum to find additional bandwidth. If there is no additional bandwidth, then the desired data rate and/or range performance cannot be met (block 1535) and the algorithm can terminate. If there is additional bandwidth, then the controller can bond additional transmission bands together (block 1540) and then return to block 1525 where it can monitor if the desired data rate and/or range performance requirements are being met.

Note that a performance requirement request from communicating requirement may typically be a request for additional transmission bandwidth to support a higher data rate or a greater transmission range. However, communicating equipment may also release allocated bandwidth via a performance request. For example, after the communicating equipment has completed transmitting a large file, the communicating equipment can release the transmission bandwidth by requesting a smaller (or no) transmission bandwidth and then releasing the large transmission bandwidth previously allocated.

Alternatively, the communicating devices may be used to perform the performance monitoring. Since the communicating devices are using the transmission bands, they may be able to monitor the data rates and range performance more readily than the controller. The communicating devices can then provide to the controller a request for additional bandwidth if the data rate and/or range performance are not being met.

Figure 16:
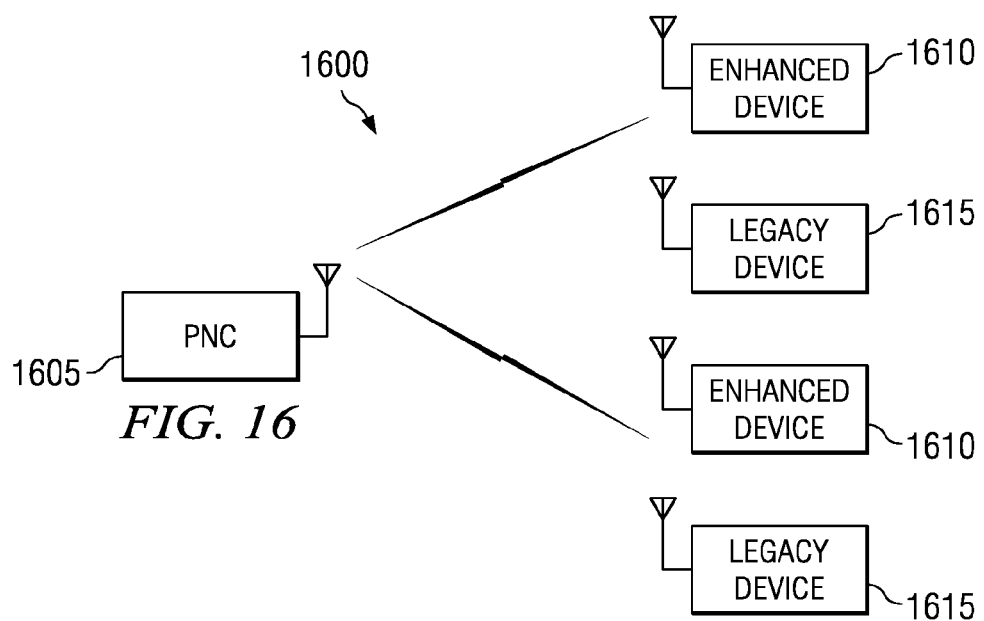
FIG. 16 is a diagram of a wireless communications system containing both legacy and enhanced communications devices, according to a preferred embodiment of the present invention.

With reference now to FIG. 16, there is shown a diagram illustrating a wireless communications system 1600 containing both legacy and enhanced communications devices and a piconet coordinator, according to a preferred embodiment of the present invention. As discussed previously, a piconet coordinator 1605 for an enhanced multi-band-OFDM wireless communications system may be able to operate with both enhanced communications devices 1610 and legacy communications devices 1615. If the piconet coordinator 1605 and the enhanced communications devices 1610 uses an enhanced preamble, such as those shown in FIGS. 6 and 7, and the legacy communications devices 1615 uses a legacy preamble, then the enhanced communications devices 1610 can make use of the additional transmissions bands in addition to sharing the legacy transmissions bands with the legacy communications devices 1615. It may be possible to provide a measure of load balancing, wherein if there is a large number of legacy communications devices 1615 making use of the legacy transmissions bands, the enhanced communications devices 1610 may exclusively use the enhanced transmissions bands to help alleviate congestion of the legacy transmissions bands. Note that the transmissions between the enhanced communications devices 1610 and the piconet coordinator 1605 may take place over bonded transmission bands.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of communication in a wireless network comprising one or more simultaneously operating pico networks, the method comprising:
    dividing the Ultra Wide Band (UWB) spectrum into a plurality of frequency bands, wherein a center frequency of each frequency band is given by:
    $FC(N)=3432+528*(N-1)$ MHz, wherein $FC(N)$ is the center frequency of band N;
    expressing each center frequency of each frequency band as a sum of powers of two factors of the smallest generated frequency;
    forming one or more band groups including one or more frequency bands from the plurality of frequency bands;
    assigning at least one band group to each one of the pico networks;
    excluding transmission in the frequency band located at 5.15 GHz to 5.85 GHz and introducing an offset of 264 MHz to frequency bands above the frequency band located at 5.15 GHz to 5.85 GHz;
    assigning at least one time frequency code to symbols associated with each one of the pico networks on a transmission-by-transmission basis, wherein the time frequency code represents one of a single frequency band and a pre-defined sequencing across all the frequency bands within the assigned band group; and
    communicating data within each one of the pico networks using the assigned band groups according to the time frequency code.

2. The method of claim 1, wherein each frequency band is 528 MHz wide.

3. The method of claim 1, further comprising:
    assigning a preamble to one or more of the pico networks.

4. The method of claim 1, wherein the UWB spectrum includes at most twelve frequency bands.

5. The method of claim 4, wherein the UWB spectrum comprises at least-three band groups each including three frequency bands.

6. The method of claim 4, wherein the UWB spectrum comprises four band groups each including three frequency bands.

7. The method of claim 4, wherein at least one of the band groups is placed above 4752 MHz in the UWB spectrum.

8. A system for channelization of a spectrum in a wireless network comprising one or more simultaneously operating pico networks, the system comprising:
    a frequency-synthesized oscillator configured to generate a signal in steps of 528 MHz beginning at center frequency of 3432 MHz and ending at center frequency of 9240 MHz and for each center frequency between center frequencies of 3432 MHZ to 9240 MHz there is a corresponding frequency band on the Ultra Wide Band (UWB) spectrum and wherein each center frequency is expressed as a sum of powers of two factors of the smallest generated frequency and is further configured to exclude transmission in the frequency band located at 5.15 GHz to 5.85 GHz and to introduce an offset of 264 MHz to frequency bands above the frequency band located at 5.15 GHz to 5.85 GHz; and
    a time frequency code generator coupled to the frequency-synthesized oscillator and configured to assign time-frequency codes to successive transmissions of a pico network such that the successive transmissions are transmitted in all frequency bands of a band group assigned to the pico network.

9. A system according to claim 8, wherein the spectrum comprises at least two band groups each including at least three frequency bands, and at least two band groups each including at least four frequency bands.

10. A system according to claim 8, wherein the spectrum comprises at least three band groups each including three frequency bands.

11. A system according to claim 10, wherein the spectrum comprises four band groups each including three frequency bands.

12. A system according to claim 10, wherein at least one of the band groups is placed above 4752 MHz in the spectrum.

* * * * *